Figure 1:
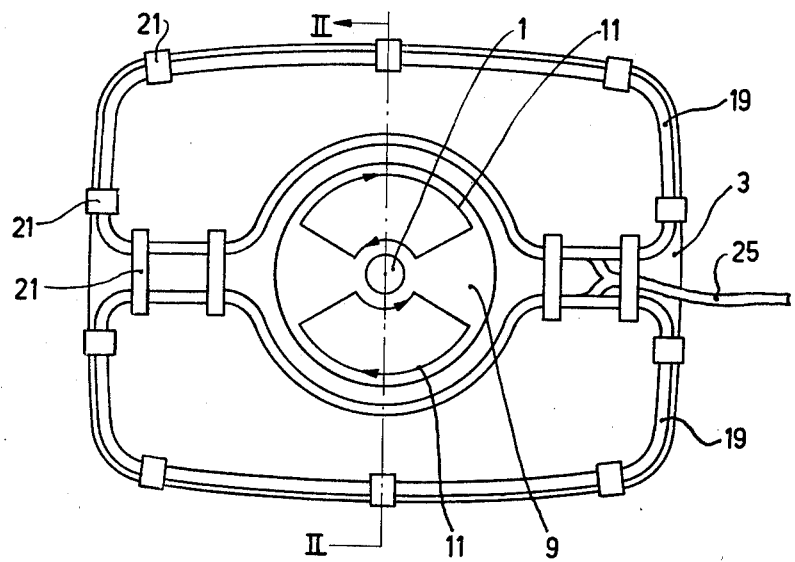

United States Patent [19]

Duistermaat et al.

[11] 3,965,386

[45] June 22, 1976

[54] DEGAUSSING DEVICE FOR A COLOR TELEVISION DISPLAY TUBE

[75] Inventors: Jan Hendrik Duistermaat; Jan Gerritsen; Constantius Johannes Waltherus Panis, all of Eindhoven, Netherlands

[73] Assignee: U.S. Philips Corporation, New York, N.Y.

[22] Filed: Sept. 3, 1974

[21] Appl. No.: 502,516

[30] Foreign Application Priority Data

Sept. 13, 1973 Netherlands .................... 7312607

[52] U.S. Cl. ................................................. 315/8
[51] Int. Cl.² ................ H01J 29/07; H01J 29/84; H01F 13/00
[58] Field of Search .................................... 315/8

[56] References Cited
UNITED STATES PATENTS

| | | | |
|---|---|---|---|
| 3,286,122 | 11/1966 | Dietch | 315/8 |
| 3,340,417 | 9/1967 | Panis et al. | 315/8 |
| 3,571,652 | 3/1971 | Shiobara et al. | 315/8 |
| 3,588,583 | 6/1971 | Ciecierski | 315/8 |
| 3,784,868 | 1/1974 | Shinkai et al. | 315/8 |
| 3,872,347 | 3/1975 | Matsushima et al. | 315/8 |

FOREIGN PATENTS OR APPLICATIONS 940,019   10/1963   United Kingdom ................ 315/8

*Primary Examiner*—Robert Segal
*Attorney, Agent, or Firm*—Frank R. Trifari; George B. Berka

[57] ABSTRACT

A degaussing device for a color television display tube having three electron guns arranged in one horizontal plane and vertically directed phosphor strips on the display screen, comprising degaussing coils which envelop a major part of the conical surface of the tube and are arranged such as to generate a vertically directed magnetic field, and a capacitor connected parallel to the degaussing coils, the impedance of the capacitor being high at the frequency of the degaussing current and low at the frequency of the line deflection current.

2 Claims, 6 Drawing Figures

DEGAUSSING DEVICE FOR A COLOR TELEVISION DISPLAY TUBE

The invention relates to a degaussing device for a color television display tube, the rearmost portion of which consists of a cylindrical neck accommodating a device for generating a number of electron beams, whilst the foremost portion consists of a truncated cone, the widest portion of which is situated on the front, and accommodates a color selection electrode which is made of ferromagnetic material and which is provided with openings, and a display screen comprising phosphor stripes, the openings and the phosphor stripes being arranged according to a pattern of lines which extend vertically in the operating condition of the display tube, the said degaussing device comprising a shield of ferromagnetic material which extends substantially parallel to the surface of the truncated cone and at least one degaussing coil which extends in the forward direction near to the foremost boundary of the conical surface and in the backward direction to a point which is situated nearer to the rear boundary than to the front boundary of this surface.

Dagaussing devices for color television display tubes are described in the publication "Philips Product Information" No. 43, (27.1.1972), entitled "Magnetic Shielding and Automatic Degaussing of Shadow-mask Tubes". As appears from this publication the best results are obtained for display tubes comprising three electron guns in a triangular arrangement when the magnetic field generated by the degaussing coils extends horizontally in the colour selection electrode. The disturbing effect of the horizontal component of the terrestrial magnetic field is thus substantially completely compensated for and that of the vertical component is mainly compensated for, so that the orientation of the television receiver has no adverse effect on the colour purity.

The electron beams in the more modern color television display tubes are situated in one horizontal plane, and the phosphor elements are provided on the display screen in vertical stripes, the color selection electrode being provided with vertical slots which are interrupted or not interrupted. In these tubes deviations of the electron beams in the vertical direction (and hence disturbing horizontal magnetic fields) are of less importance, because they do not cause the landing of the electron beams on phosphor elements of the wrong color.

Horizontal deviations of the electron beam, and hence vertical, disturbing magnetic fields, however, do cause color impurities. Consequently, it is important to achieve maximum shielding of the disturbing vertical component of the terrestrial magnetic field, which cannot very well be achieved using known degaussing devices.

The invention has for its object to provide a degaussing device by means of which maximum shielding of vertical magnetic fields can be achieved. To this end, the degaussing device according to the invention is characterized in that the location of the degaussing coil is such that the magnetic field generated in the color selection electrode when current passes through this coil is mainly vertically directed, while shunting means are connected parallel to the degaussing coil, the impedance of the said shunting means being substantially higher than that of the degaussing coil at the frequency of the degaussing current, while it is substantially lower at the frequency of the line deflection current.

It is to be noted that Netherlands Pat. specification No. 6,905,722 describes a degaussing device in which a vertical magnetic field is generated in the color selection electrode. However, in this known device the degaussing coils do not extend to a point which is situated nearer to the rear boundary than to the front boundary of the conical surface. However, for proper operation of the degaussing device it is of importance, particularly in display tubes having large screen dimensions (for example, a diagonal of 66 cm) and large deflection angles (for example, 110°), that the degaussing coils cover an as large as possible part of the conical surface. Degaussing coils covering an as large as possible surface are even absolutely required if the ferromagnetic shield is situated inside the wall of the cone which, as described in the quoted publication, substantially benefits the shielding effect of the degaussing device. If such degaussing coils which extend far to the rear are used for generating a vertically extending magnetic field, it appears, however, that the rear portions of the degaussing coils are situated within the stray field of the horizontal deflection coils which are arranged on the display tube at the area of the transition between neck and cone. As a result, voltages are induced in the degaussing coils which have the repetition frequency of the horizontal deflection (line frequency) having a value of approximately 15 kHz. Consequently line frequency currents start to flow in the circuit incorporating the degaussing coils, the said currents causing an additional horizontal deflection field in the cone. It generally appears that this additional deflection field is not symmetrical, i.e. it causes deviations on the left-hand half of the display screen which differ from those on the right-hand half, so that these deviations are very difficult to correct. In prior art devices in which the degaussing coils generate a horizontal magnetic field, this problem does not arise because the rear portions of the degaussing coils are situated in the stray field of the vertical deflection coils. The image deflection field generated by these coils has a much lower repetition frequency than the line deflection field (generally 50 Hz), so that no voltages of any significance are induced in the degaussing coils.

A feasible solution to the problem imposed by the induced line frequency voltage is the concentration of the degaussing coils on the front of the cone as proposed in the said Netherlands pat. application Ser. No. 6,905,722. The drawbacks thereof, notably in the case of large display screens and large deflection angles, have already been discussed. Another solution would be to incorporate a switch in series with the degaussing coils, the said switch being opened by a delay mechanism after the degaussing period, or to incorporate a choke coil which allows passage of the low-frequency degaussing current but which blocks line frequency currents. However, both solutions are expensive and hence not very suitable for a mass product such as a color television receiver. When the step according to the invention is taken, the degaussing coils are short-circuited for line frequency currents, with the result that the line frequency currents induced in these coils extend like the line deflection field. The additional deflection then causes a symmetrical error which can be readily corrected. The shunting means preferably consist of a capacitor to minimize the costs.

The invention will be described in detail hereinafter with reference to the drawing.

Figure 2:
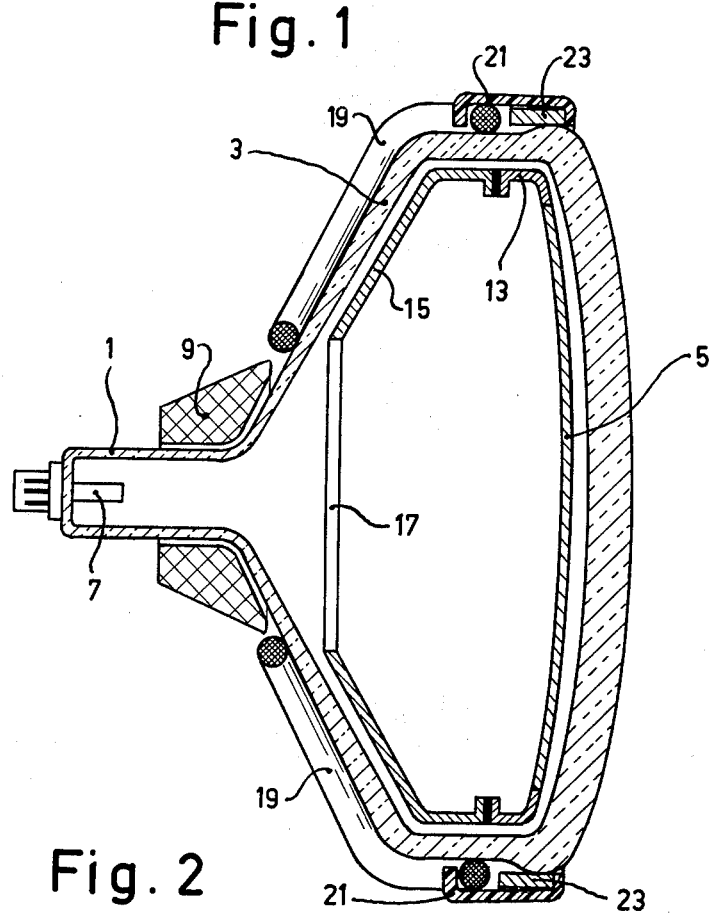
Figure 3:
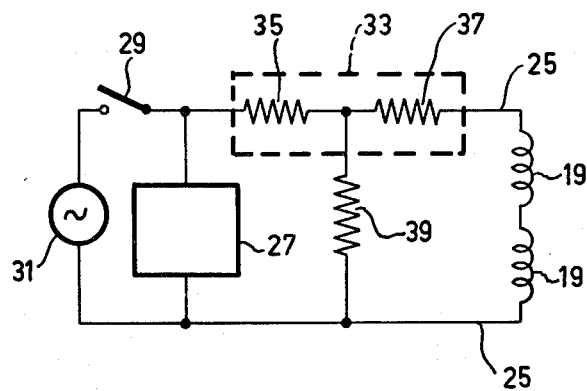
Figure 4:
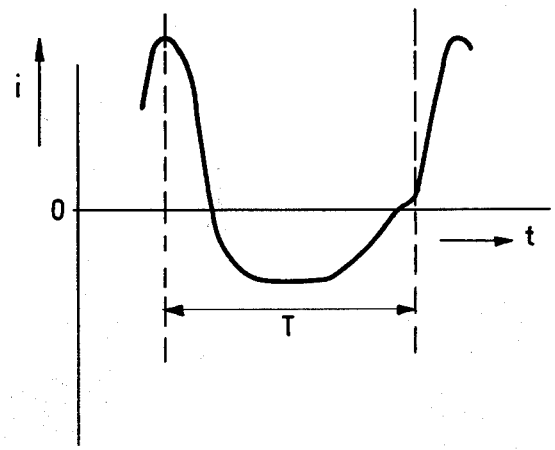
Figure 5:
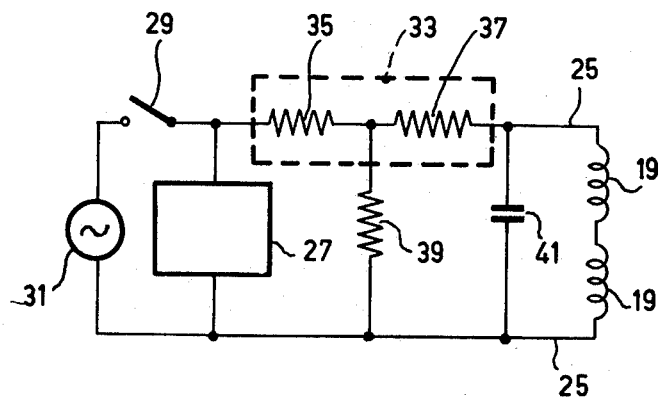
Figure 6:
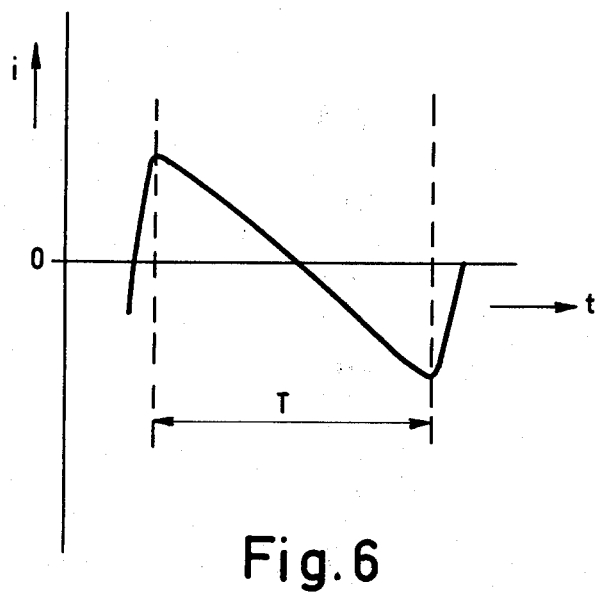

FIG. 1 is a rear view of a color television display tube provided with a degaussing device according to the invention, FIG. 2 is a longitudinal sectional view of the display tube shown in FIG. 1, FIG. 3 shows a diagram of a known power supply circuit for degaussing coils, FIG. 4 is a diagrammatic representation of the variation of a line frequency current induced in the degaussing coils connected as shown in FIG. 3, FIG. 5 shows a diagram of the power supply of the degaussing device according to the invention, and FIG. 6 is a diagrammatic representation of the variation of a line frequency current induced in the degaussing coils connected as shown in FIG. 5.

FIGS. 1 and 2 are a rear view and a longitudinal sectional view, respectively, of a color television display tube of the kind set forth provided with a degaussing device according to the invention. All details which are not relevant for a proper understanding of the present invention have been ommitted for the sake of clarity.

The display tube consists of a cylindrical neck 1 and a truncated cone 3, the widest portion of which is situated on the front of the tube, a color selection electrode 5 and a display screen (not shown).

The color selection electrode 5 comprises a pattern of vertical slots which may be interrupted by reinforcement dams. The display screen comprises a pattern of vertical phosphor stripes which, when struck by electrons, luminesce in one of the red, green or blue colors. Present in the rear portion of the neck 1 are three electron guns 7 (diagrammatically shown) which are adjacently arranged in one horizontal plane. At the area of the transition between the neck 1 and the cone 3 a deflection unit 9 (diagrammatically shown) is provided which inter alia comprises two line deflection coils 11 for the deflection of the electron beams in the horizontal direction. As is shown in FIG. 1, the line deflection coils 11 may be, for example, saddle-shaped coils in which a sawtooth current having a frequency of approximately 15 kHz flows during operation.

The color selection electrode 5 is suspended from a carrier edge 13 which is secured in the tube by means not shown. Also connected to this carrier edge is a shield 15 which extends along a substantial part of the inner surface of the cone 3. The shield 15 as well as the carrier edge 13 and the color selection electrode are made of a material having a high magnetic permeability, so together they constitute a magnetically closed circuit which completely envelops the interior of the cone 3 with the exception of an opening 17 in the shield 15 for the passage of the electron beams.

Provided on the exterior of the cone 3 are two degaussing coils 19 which are symmetrically situated with respect to the plane of the electron guns 7. The degaussing coils 19 are connected, by way of hooks 21 of synthetic material, to a metal reinforcement band 23 which encloses the front portion of the cone, and to each other. The degaussing coils extend in the forward direction near to the front boundary of the surface of the cone 3 and to the rear as far as is permitted by the deflection unit 9, so that they enclose a very large part of the cone surface. The degaussing coils 19 can be connected to a suitable power supply circuit via connection wires 25.

FIG. 3 diagrammatically shows a known power supply circuit for this purpose. A television receiver 27 is connected, via a mains switch 29, to an alternating voltage source 31, for example, the public electricity mains. The degaussing coils 19 are connected, via the connection wires 25 and a double thermistor 33, to the switch 29. The double thermistor 33 consists of two resistors 35 and 37 which are thermally interconnected and which have a high positive temperature coefficient. After the closing of the switch 29, initially a large current flows through the degaussing coils 19, the said current gradually decreasing to a very low value as the resistors 35 and 37 become hot, with the result that the degaussing coils 19 generate a decreasing magnetic field which alternates at the mains frequency and which is required for degaussing the space inside the cone 3. In order to prevent cooling down of the resistors 35 and 37 after the decreasing of the current, a dissipation resistor 39 is provided, so that sufficient current continues to flow through the resistors 35 and 39 to keep the double thermistor 33 at the desired temperature, without a current of any significance flowing through the degaussing coils 19.

It was found that the use of this known power supply circuit for degaussing coils as described with reference to the FIGS. 1 and 2 involves asymmetries in the landing of the electron beams. This means than the centres of the electron beams are no longer incident at the center of the associated phosphor stripes but at some distance therefrom, this deviation varying asymmetrically as a function of the location on the display screen. In a given case, for exmple, on the left of the display screen deviations of 20 $\mu$m to the left were observed, in the centre of the display screen deviations of 10 $\mu$m to the right, while on the right of the display screen practically no devications were observed. This phenemenon can be explained as follows. Because of the nearness of the line deflection coils 11, a line frequency voltage is induced in the degaussing coils 19, the said voltage causing a decaying current $i$ in the circuit formed by the degaussing coils in conjunction with the resistors 37 and 39 and the parasitic capacitance of the degaussing coils and of the resistor 37, the said current generating a magnetic field in the degaussing coils, thus causing an additional deflection of the electron beams in the cone 3. This current $i$ varies as a function of time approximately as shown in FIG. 4. During the time T of a scan of the (sawtooth) line deflection voltage, the current $i$ first has a high positive value, subsequently a lower negative value, followed by a decrease to zero, which corresponds to the observed landing errors. Such asymmetrical errors are very difficult to correct; this is in contrast with symmetrical landing errors which can be eliminated by way of a small axial shift of the deflection unit 9.

FIG. 5 shows a power supply circuit in which according to the invention a capacitor 41 is connected parallel to the degaussing coils 19, whilst the remainder of the circuit is identical to that shown in FIG. 3. By a suitable choice of the value of the capacitor 41, it can be achieved that this capacitor constitutes a very high impedance for the lowfrequency degaussing current and a very low impedance for the line frequency current. The degaussing coils 19 are then substantially short-circuited for line frequency currents, with the result that a line frequency voltage induced in the circuit formed by the degaussing coils and the capacitor 41 causes a current $i$ which has the same shape as the line deflection current. This current *i* is diagrammatically shown in FIG. 6. It is clearly shown that this current varies symmetrically, and hence causes a symmetrical landing error which can be readily corrected. Favourable results were obtained in practice for degaussing coils 19 having a combined inductance of 10 mH using a capacitor 41 having a capacitance of 0.1 $\mu$F.

Many variations of the described embodiment are feasible within the scope of the invention. For example, the shield 15 can be provided outside the cone 3, the coils 19 possibly being situated partly inside and partly outside the shield. Instead of the two coils 19, a single coil of a suitable shape can alternatively be used.

Instead of the power supply circuit described with reference to FIG. 3, other known power supply circuits can also be rendered suitable for use in a degaussing device according to the invention by means of a capacitor 41 or other suitable shunting means.

What is claimed is:

1. A color cathode ray tube having an evacuated envelope including a neck portion, a truncated conical front portion and deflection means located at the junction of said neck and front portions and, within said envelope, means to generate a number of electron beams emanating in a substantially horizontal plane during the normal operating condition of the tube, a color selection electrode made of a ferromagnetic material and provided with a plurality of slots, a display screen at the wide end of said front portion, said screen having a plurality of phosphor stripes, said slots and said stripes being arranged according to a pattern of lines which extend substantially vertically during the normal operating condition of the tube, a degaussing device comprising a shield of ferromagnetic material disposed substantially parallel to the conical wall of said front portion, at least one degaussing coil embracing a major surface portion of said conical wall and oriented such as to provide, when energized by an alternating degaussing current, a substantially vertically directed magnetic field in said color selection electrode, and shunting means connected parallel to said degaussing coil and having an impedance which is higher than that of said degaussing coil at the frequency of the degaussing current but lower at the frequency of the line deflection current.

2. A color cathode ray tube as claimed in claim 1, wherein the shunting means include a capacitor.

* * * * *

UNITED STATES PATENT AND TRADEMARK OFFICE
CERTIFICATE OF CORRECTION

PATENT NO. : 3,965,386
DATED : June 22, 1976
INVENTOR(S) : JAN H. DUISTERMAAT ET AL It is certified that error appears in the above-identified patent and that said Letters Patent are hereby corrected as shown below:

Column 2, line 1, change "whilst it is" to --and being--;

Column 4, line 32, change "exmple" to --example--.

Signed and Sealed this

Twelfth Day of October 1976

[SEAL]

Attest:

RUTH C. MASON
*Attesting Officer*

C. MARSHALL DANN
*Commissioner of Patents and Trademarks*